UNITED STATES PATENT OFFICE.

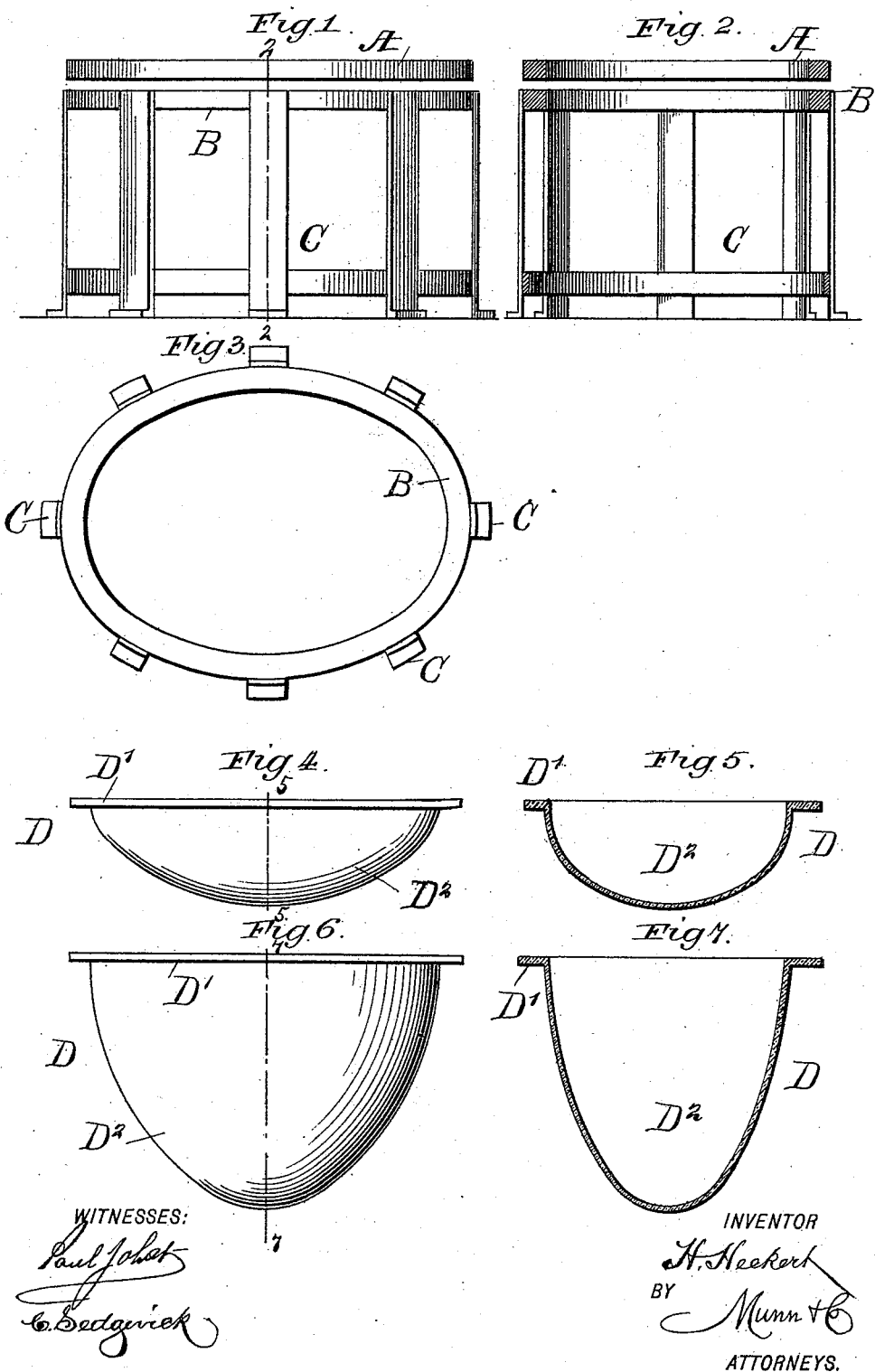

HUGO HECKERT, OF HALLE-ON-THE-SAALE, GERMANY.

METHOD OF FORMING GLASS DOMES.

SPECIFICATION forming part of Letters Patent No. 497,574, dated May 16, 1893.

Application filed November 14, 1892. Serial No. 451,923. (No specimens.) Patented in Germany January 18, 1885, No. 32,027.

*To all whom it may concern:*

Be it known that I, HUGO HECKERT, at present residing in Halle-on-the-Saale, in the Kingdom of Prussia, Germany, have invented a new and Improved Method for Forming Glass Domes, (for which I have obtained Letters Patent in Germany, No. 32,027, dated January 18, 1885,) of which the following is a full, clear, and exact description.

The object of the invention is to provide a new and improved method for conveniently and rapidly forming flanged glass domes from flat glass plates for optical and other purposes.

The method consists in clamping a flat glass plate at its edge between rings, and then subjecting the clamped plate to heat to permit the middle part of the glass plate to sag so as to form a dome-shaped glass or bowl.

In order to carry the method into effect, I prefer an apparatus such as shown in the accompanying drawings, forming a part of this specification, in which similar letters of reference indicate corresponding parts in all the figures.

Figure 1 is a side elevation of the apparatus. Fig. 2 is a transverse section of the same on the line 2—2 of Fig. 1. Fig. 3 is a plan view of one of the rings. Fig. 4 is a side elevation of the dome formed by the apparatus. Fig. 5 is a transverse section of the same on the line 5—5 of Fig. 4. Fig. 6 is a side elevation of a dome of modified form; and Fig. 7 is a transverse section of the same on the line 7—7 of Fig. 6.

The apparatus consists principally of two heavy rings A and B, of which the latter is supported on a suitable framework C, as plainly shown in Figs. 1 and 2. The rings A and B are alike in shape and are preferably made of metal so as to securely clamp a flat glass plate between the two rings. The flat glass plate conforms in shape to the rings, is first placed on top of the ring B and then the other ring A is placed on the top surface of the glass plate so as to securely clamp the latter between the two rings. The entire apparatus with the clamped plate is then passed into a suitable furnace and subjected to heat to such a degree that the glass material inside of the rings, by its own weight, sags, to form a bowl or dome shaped glass, having a flange, that is, that part clamped between the rings A and B. By exposing the apparatus to a more or less intense heat, a larger or smaller dome will be formed.

As shown in Figs. 4 and 5, the dome D has an annular flange D' and a dome $D^2$ of bowl-shape while in Fig. 6, the dome is parabolic in cross section. As soon as the desired form has been obtained the entire apparatus is removed from the furnace and permitted to gradually cool, after which the ring A is lifted off the flange D' and then the dome is removed from the other ring B, and its frame C. Domes formed in this manner are utilized for making concave and convex mirrors, lenses and other articles used for optical purposes, &c.

Having thus fully described my invention, I claim as new and desire to secure by Letters Patent—

1. The herein described method for forming glass domes, consisting in clamping a flat glass plate between two rings, and then subjecting the glass plate to the action of heat so that that part of the plate between the rings sags by its own weight to form the dome, substantially as shown and described.

2. The herein described method for forming glass domes, consisting in clamping a flat glass plate between two rings, then subjecting the glass plate to the action of heat so that that part of the plate between the rings sags by its own weight to form the dome, and then permitting the dome to gradually cool, substantially as shown and described.

Halle-on-the-Saale, October 6, 1892.

HUGO HECKERT.

Witnesses:
CARL BORNGRABER,
WALTER REITING.